No. 655,416. Patented Aug. 7, 1900.
J. PHILIPPI.
MACHINE FOR SEPARATING ROCK ASPHALT.
(Application filed Feb. 15, 1900.)
(No Model.) 3 Sheets—Sheet 1.
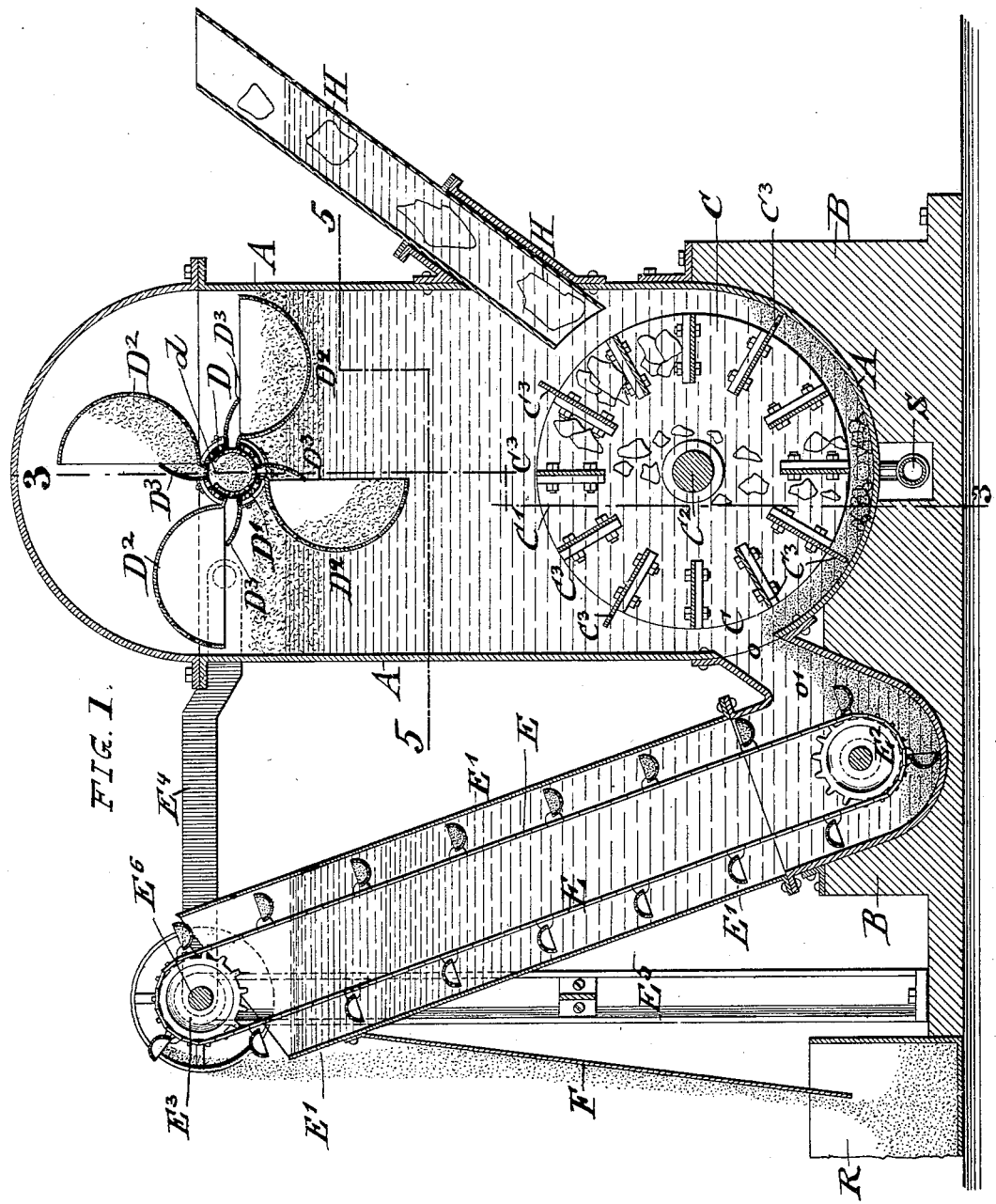

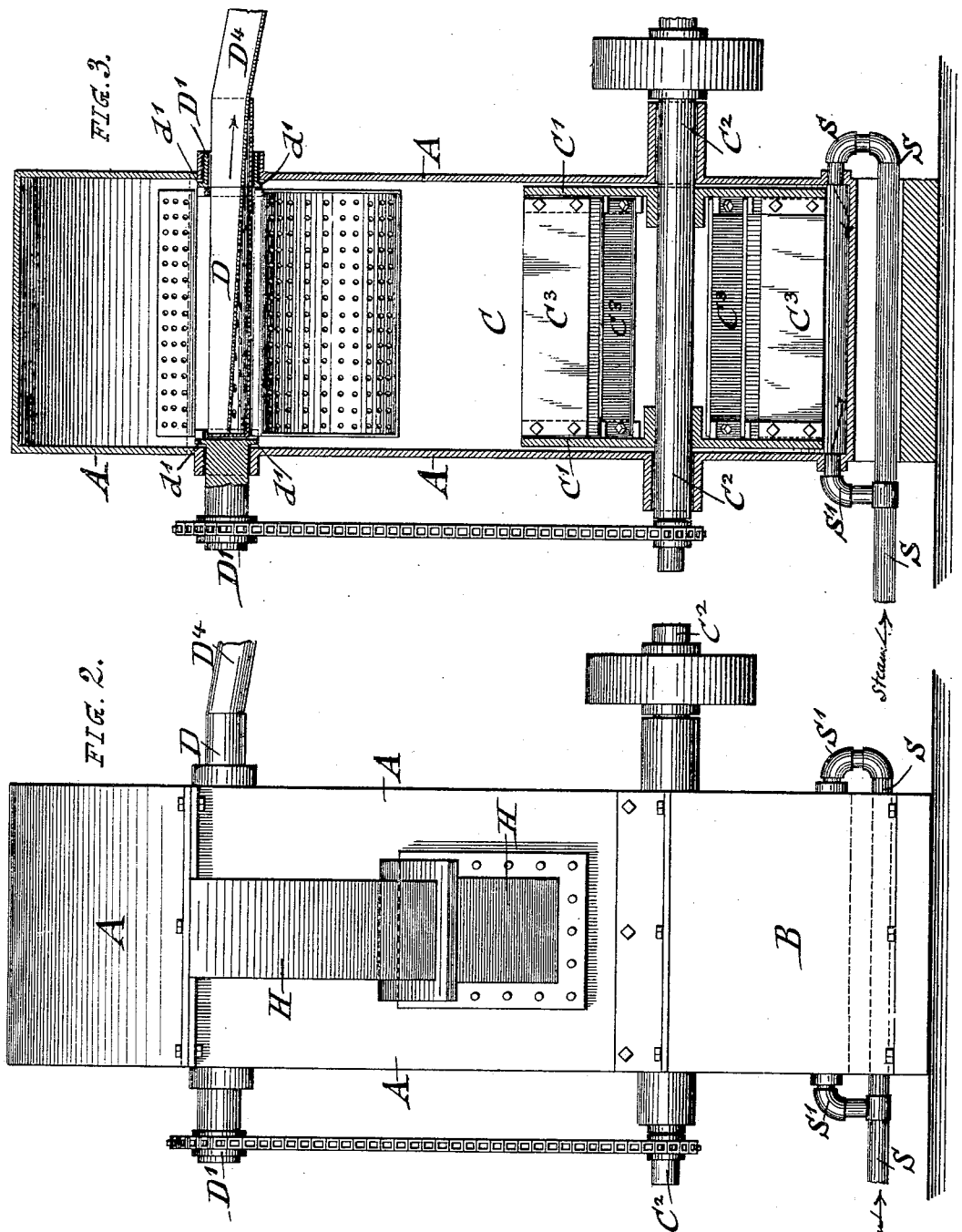

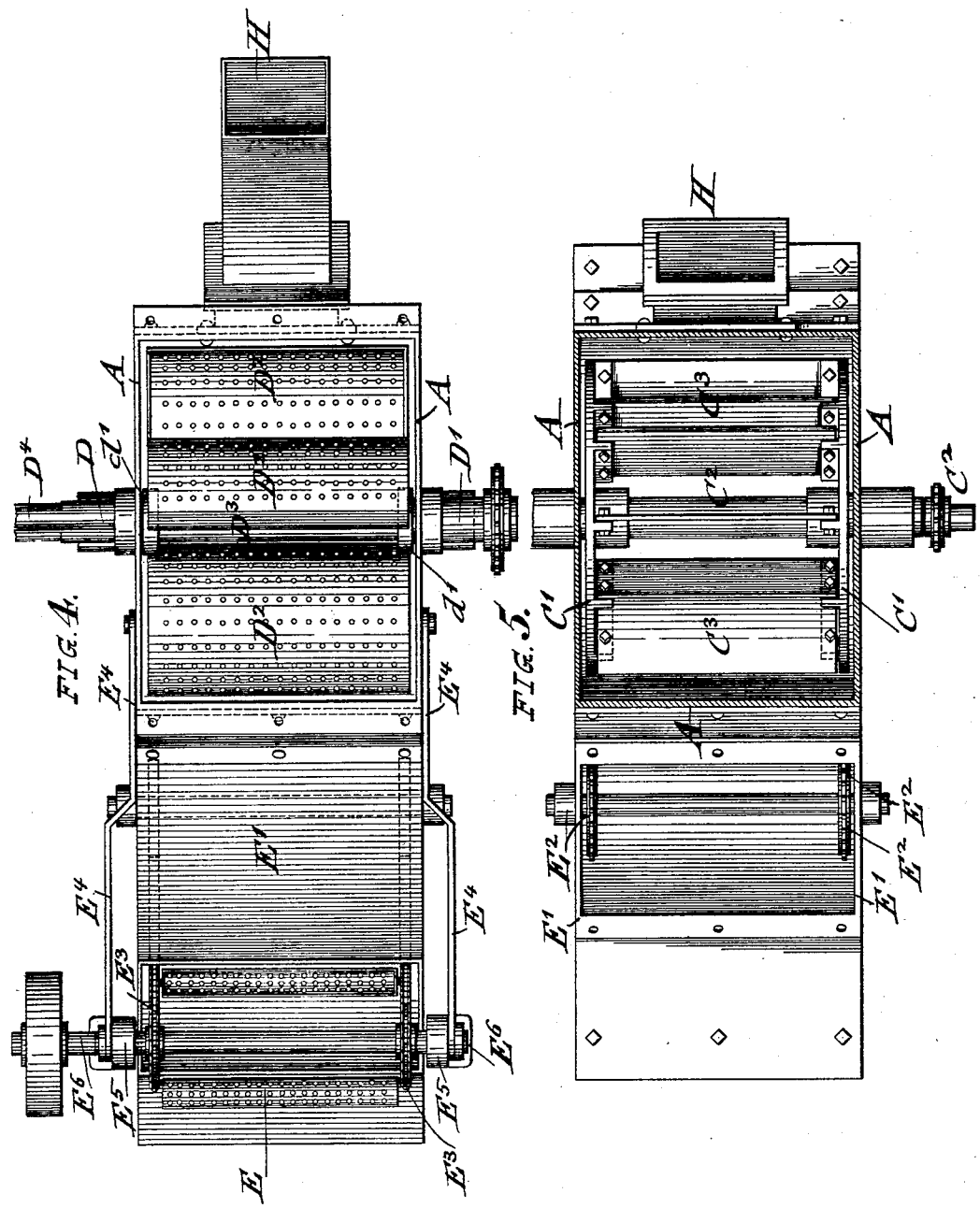

UNITED STATES PATENT OFFICE.

JACOB PHILIPPI, OF NEW YORK, N. Y., ASSIGNOR OF ONE-HALF TO MAURICE FEATHERSON, OF SAME PLACE.

MACHINE FOR SEPARATING ROCK-ASPHALT.

SPECIFICATION forming part of Letters Patent No. 655,416, dated August 7, 1900.

Application filed February 15, 1900. Serial No. 5,315. (No model.)

*To all whom it may concern:*

Be it known that I, JACOB PHILIPPI, a citizen of the United States, residing in New York, borough of Manhattan, State of New York, have invented certain new and useful Improvements in Machines for Separating Rock-Asphalt, of which the following is a specification.

This invention relates to an improved machine for separating the asphaltum contained in the rock-asphalt found in Texas and in other places in the United States from the heavier sand and other admixtures that are intermixed with it, said machine permitting the separation of the substances according to their different specific gravities, so that the asphaltum is obtained in pure state and adapted for use in the usual manner for street-paving and similar purposes; and the invention consists of a machine for separating rock-asphalt, which machine comprises an upright casing, a supply-hopper at one side of said casing, a rotary separator at the lower part of said casing, said separator being provided with longer and shorter stirrer-arms, a rotary skimming-wheel arranged at the upper part of said casing and provided with perforated buckets communicating with a hollow transverse trough for conducting off the separated asphalt, and an elevator connected with the lower part of the casing at its opposite side, so as to convey off the sand which is separated from the asphaltum and collected at the bottom of the casing by intermittently reversing the motion of the rotary separator at the lower part of the casing.

The invention consists, further, of certain details of construction and combinations of parts, which will be fully described hereinafter and finally pointed out in the claims.

In the accompanying drawings, Figure 1 represents a vertical longitudinal section of my machine for separating rock-asphalt. Fig. 2 is a side elevation of the same. Fig. 3 is a vertical transverse section on line 3 3, Fig. 1. Fig. 4 is a plan view of my improved machine with a portion of the casing removed; and Fig. 5 is a horizontal section on line 5 5, Fig. 1.

Similar letters of reference indicate corresponding parts.

Referring to the drawings, A represents the upright casing of my improved machine for separating rock-asphalt. The casing A is preferably made of boiler-iron, with semicircular portions at its lower and upper ends. The casing is supported in upright position on a suitable bed-plate B and filled with hot water to about two-thirds of its height, the water being kept hot by supplying steam to the interior of the casing by a steam-supply pipe S, having branch pipes S', which enter through the side walls of the casing A at the lower part of the same, as shown clearly in Figs. 2 and 3. The rock-asphalt is delivered in the condition in which it comes from the mine to an inclined hopper H at the ingoing side of the casing A and conducted by its own weight to the lower part of the casing A, where it is taken up by a rotary separator C, which is formed of two disk-shaped heads C', attached to a transverse shaft $C^2$, to which rotary motion is imparted in one or the opposite direction by suitable motion-transmitting belts and pulleys from a counter-shaft or directly from the steam-engine by which the power is supplied. The shaft $C^2$ turns in suitable bearings of the casing A. The rotary separator C is provided with a number of radial beaters or stirrers $C^3$, some of which are extended beyond the circumference of the heads C', so that their edges pass closely to the lower semicircular portion of the casing A, as shown in Fig. 1. The beaters or stirrers $C^3$ agitate the rock-asphalt which is supplied through the hopper H and break it up in connection with the hot water in the casing, so that by the successive lifting and dropping of the same by the beaters, and especially by the elongated beaters, the rock-asphalt is gradually disintegrated and the sand and other impurities therein separated therefrom, the asphaltum being gradually transferred to the surface of the water in the casing for the reason that its specific gravity is less than that of water. The asphaltum has thereby a tendency to rise and float on the surface of the water, while the sand, having a greater specific gravity, is collected at the lower part of the casing.

In the upper part of the casing A is arranged a transverse tubular trough D, having an opening d at its upper part. This trough D is surrounded by a hollow perforated shaft D′, having flanges d′, to which are attached semicircular perforated bucket-shaped strainers D², which take up the asphaltum that is collected in the nature of a scum on the surface of the water, strain the same, and discharge it into the trough D, in connection with curved and perforated guard-plates D³, that are also attached to the flanges d′ and extend close to the inner ends of the buckets D² toward the slotted opening d of the trough D. The strained asphaltum is conducted through the inclined trough D to a discharge-trough D⁴, through which the asphaltum is conducted off. The tubular trough D is stationary, while the tubular shaft D′ is supported in suitable bearings of the casing A and rotated by a sprocket-wheel and chain transmission from the shaft C² of the separator C, as shown in Fig. 3. The bucket-shaped strainers D² and guard-plates D³ are rotated with the shaft D′, the shaft and trough being provided with perforations, so as to strain off the water still contained in the asphaltum after it has been transmitted from the strainers to the trough.

The lower part of the casing A is provided with an opening o at the side opposite to that at which the hopper H is arranged, said opening o being connected by a downwardly-extending throat o′ with the pocket-shaped lower end of the trunk E′ of a bucket elevator E, which is stretched over guiding and driving wheels E² E³, the buckets of the elevator being likewise perforated, so as to act as strainers for the sand that is lifted up by the buckets and conveyed by the elevator to the outside. The sand is discharged at the upper end of the elevator over an inclined plate F into a suitable receptacle R. The trunk of the bucket elevator E is supported by its lower end on the bed-plate B and at its upper end by strong brackets E⁴ and uprights E⁵, which carry the bearings for the shaft E⁶ of the driving-wheels E³, as shown in Figs. 1 and 4, said shaft receiving rotary motion by a suitable belt-and-pulley transmission from the driving-shaft of the machine.

The operation of my improved machine for separating rock-asphalt is as follows: A determined quantity of rock-asphalt is treated at one time, as the operation of the machine is not intended to be continuous, but intermittent. It is charged through the hopper H into the lower part of the casing A, beaten up by the separator C, which is rotating in the direction of the arrow shown in Fig. 1, so that gradually, in connection with the hot water, the asphaltum and sand are gradually separated from each other, the sand being collected at the lower part of the casing A, while the asphalt by reason of its smaller specific gravity is collected as a scum on the surface of the water in the casing and conducted off by the perforated strainers and inclined trough to the outside of the casing.

When the charge of rock-asphalt in the casing has been sufficiently worked up by the separator, so that the complete separation of the sand from the asphaltum has taken place, the motion of the separator is reversed by reversing the driving mechanism of its shaft, so that the longer beaters C⁴ quickly transfer the sand accumulated in the lower part of the casing into the lower part or pocket of the elevator-trunk, where it is taken up by the elevator-buckets and discharged into the receptacle R.

By the reversing of the motion of the elevator and the transference of the sand from the casing to the elevator the level of the water in the casing falls, so that but little resistance is offered to the motion of the strainers by the water. As soon as all the sand is transferred a new charge of rock-asphalt is supplied through the hopper to the casing and the motion of the separator reversed. The new charge raises the water-level in the casing, so that the strainer-buckets are enabled to take up the floating asphaltum and transmit it to the stationary trough and discharge-trough to the outside. The new charge of rock-asphalt being conducted directly to the lower part of the casing is not placed in contact with the separated asphaltum at the upper part of the same, so that no contamination of the purified asphaltum can take place. From time to time an additional quantity of water is supplied to the casing, so as to keep up the required water-level in the same, which is essential to the effective working of the machine. When the new charge is properly worked up and the same separated from the asphaltum removed, another charge is supplied to the machine, and so on, the result being an effective, economical, and uniform yield of purified asphaltum, which is then ready for shipment and use.

My improved machine has the advantage that considerable quantities of rock-asphalt can be worked up and purified in the manner described without employing hand labor and the crude mechanisms by which the separation of the asphaltum and sand was heretofore accomplished. Other advantages are that the machine automatically discharges the asphaltum and sand at opposite sides of the machine, that no leakage of water can take place, and that the reliable and effective running of the machine can be kept up with little difficulty.

Having thus described my invention, I claim as new and desire to secure by Letters Patent—

1. The combination, with an upright casing provided with a supply-hopper for the rock-asphalt, said hopper being an entirely-separate element from said casing, of a suitable separator in the lower part of said casing, the discharge end of said hopper terminating close to said separator so as to deliver the rock-asphalt directly thereinto, a perforated tubular rotary shaft in the upper part of said casing, above the separator, perforated strainer-buckets attached to said shaft, and a stationary trough in said shaft, leading outside the casing, substantially as set forth.

2. The combination with an upright casing provided with a supply-hopper for the rock-asphalt, of a separator at the lower part of said casing, a tubular rotary shaft at the upper part of said casing and provided with openings, perforated strainer-buckets attached to said shaft, perforated guard-plates adjacent to the inner ends of the strainer-buckets, and means for discharging the separated asphalt from the trough to the outside, substantially as set forth.

3. The combination, with an upright casing, provided with a supply-hopper for the rock-asphalt, said casing having a semicircular bottom, of a rotary horizontal separator arranged in juxtaposition to said semicircular bottom and having radial beaters, some of which extend farther beyond the axis of the separator than the others and terminate close to said semicircular bottom, and a bucket elevator, the trunk of which is connected with the lower part of the casing, whereby upon a backward rotation of said separator the more extended beaters transfer the sand in the casing to the bucket elevator, substantially as set forth.

4. The combination, with an upright casing provided with a supply-hopper for the rock-asphalt, a rotary separator at the lower part of said casing provided with radial beaters, means for heating the water in the casing, a tubular rotary shaft at the upper part of said casing, strainer-buckets attached to said shaft for removing the asphalt from the surface of the water in the casing, a stationary trough in said shaft, and a discharge-trough for conducting the strained asphalt to the outside of the casing, substantially as set forth.

In testimony that I claim the foregoing as my invention I have signed my name in presence of two subscribing witnesses.

JACOB PHILIPPI.

Witnesses:
M. H. WURTZEL,
G. C. GEIBEL.